US011412375B2

(12) United States Patent
Fajri et al.

(10) Patent No.: US 11,412,375 B2
(45) Date of Patent: Aug. 9, 2022

(54) ESTABLISHING UNTRUSTED NON-3GPP SESSIONS WITHOUT COMPROMISING SECURITY

(71) Applicant: Cisco Technology, Inc., San Jose, CA (US)

(72) Inventors: Anthony Fajri, Pleasanton, CA (US); Gautam Mohanlal Borkar, Redmond, WA (US); Solomon Ayyankulankara Kunjan, Milton (CA); Tariq Habibullah, Allen, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 359 days.

(21) Appl. No.: 16/654,514

(22) Filed: Oct. 16, 2019

(65) Prior Publication Data
US 2021/0120403 A1    Apr. 22, 2021

(51) Int. Cl.
*H04W 12/037*    (2021.01)
*H04W 76/11*    (2018.01)
(Continued)

(52) U.S. Cl.
CPC ........... *H04W 12/037* (2021.01); *H04L 12/66* (2013.01); *H04L 61/1511* (2013.01);
(Continued)

(58) Field of Classification Search
CPC ... H04W 12/037; H04W 12/04; H04W 76/11; H04L 12/66; H04L 61/1511; H04L 61/203
(Continued)

(56) References Cited

U.S. PATENT DOCUMENTS 6,658,476 B1 * 12/2003 Van ................ H04L 67/42
709/223
7,917,758 B2 * 3/2011 Palekar ............ H04L 63/0428
713/171
(Continued)

FOREIGN PATENT DOCUMENTS

EP          3506598        7/2019
WO    WO 2018/172707 A1    9/2018
WO        2019002754        1/2019

OTHER PUBLICATIONS

International Search Report and Written Opinion from the International Searching Authority, dated Dec. 15, 2020, 12 pages, for corresponding International Patent Application No. PCT/US2020/054852.

(Continued)

*Primary Examiner* — David P Zarka
(74) *Attorney, Agent, or Firm* — Polsinelli PC (57) ABSTRACT

Systems, methods, and devices are disclosed for establishing sessions over a network. A query can be sent, from a mobile device to an authoritative DNS server, requesting a session over a network. In response to the query, a list of available communication protocol options can be received from the authoritative DNS server. A specific communication protocol can be selected from the list of available communication protocol options, where the specific communication protocol is selected based on one or more performance metrics. A connection with a gateway device can then be initiated using the selected specific communication protocol.

17 Claims, 7 Drawing Sheets

(51) Int. Cl.
*H04L 12/66* (2006.01)
*H04L 61/4511* (2022.01)
*H04L 61/503* (2022.01)
*H04W 12/04* (2021.01)

(52) U.S. Cl.
CPC .......... *H04L 61/203* (2013.01); *H04W 12/04* (2013.01); *H04W 76/11* (2018.02)

(58) Field of Classification Search
USPC ........................................................ 713/153
See application file for complete search history.

(56) References Cited

U.S. PATENT DOCUMENTS

| | | | | |
|---|---|---|---|---|
| 8,265,281 | B2* | 9/2012 | Wang | H04L 69/16 |
| | | | | 380/270 |
| 9,003,057 | B2 | 4/2015 | Mahaffey et al. | |
| 9,479,422 | B2* | 10/2016 | Sundaresan | H04L 67/16 |
| 9,788,294 | B2* | 10/2017 | Miklos | H04L 61/1511 |
| 9,935,925 | B2* | 4/2018 | Meuleman | H04L 9/0841 |
| 10,341,126 | B2 | 7/2019 | Stammers et al. | |
| 10,440,556 | B2* | 10/2019 | Cho | H04W 76/14 |
| 2006/0067272 | A1* | 3/2006 | Wang | H04W 12/069 |
| | | | | 370/331 |
| 2008/0165706 | A1* | 7/2008 | Bozionek | H04M 7/006 |
| | | | | 370/259 |
| 2011/0238852 | A1* | 9/2011 | Guruswamy | H04L 43/50 |
| | | | | 709/230 |
| 2014/0337530 | A1* | 11/2014 | Amishav | H04L 61/1511 |
| | | | | 709/226 |
| 2019/0068503 | A1* | 2/2019 | Wei | H04L 43/16 |
| 2019/0116535 | A1* | 4/2019 | Szilagyi | H04L 43/0829 |
| 2019/0182114 | A1 | 6/2019 | Tarvidis et al. | |

OTHER PUBLICATIONS

Hamilton, R., et al., "QUIC: A UDO-Based Multiplexed and Secure Transport," draft-hamilton-quic-transport-protocol-01, Network Working Group, Oct. 31, 2016, pp. 1-45.

Kumar et al., "Implementation and Analysis of QUIC for MQTT," arxiv.org, Jan. 3, 2019, pp. 1-19.

* cited by examiner

ESTABLISHING UNTRUSTED NON-3GPP SESSIONS WITHOUT COMPROMISING SECURITY

TECHNICAL FIELD

The present disclosure relates generally to session establishment, specifically to establish secure sessions over untrusted (e.g. non-3GPP) networks.

BACKGROUND

There is a need for Wi-Fi calling or other voice and data sessions to be established over untrusted (e.g., non-3rd Generation Partnership Project (3GPP) networks that need the Evolved Packet Data Gateway (ePDG) to provide security mechanisms) as well as trusted networks (e.g., 3GPP networks or other networks that can interact directly with the Evolved Packet Core (EPC)).

3GPP supports session establishment (e.g. for Wi-Fi calling) over non-3GPP untrusted networks using ePDG in Long-Term Evolution (LTE) networks and Non-3GPP Interworking Function (N3IWF) in Fifth Generation (5G) networks. To ensure secure communications over untrusted non-3GPP networks, Internet Protocol Security (IPSec) tunnels are created by the user equipment (UE) to authenticate and encrypt packets of data (IPSec is a secure network protocol suite that authenticates and encrypts the packets of data sent over an Internet Protocol network).

This, however, results in various problems during implementation. For example, current methodologies for untrusted Non-3GPP calls rely on the creation of multiple IPSec tunnels. For example, there must be at least two different IPSec tunnels connected to the UE—an inner IPSec tunnel between an IP Multimedia Subsystem (IMS) Application on the UE and IMS core in the network, and an outer IPSec tunnel between the UE and ePDG. This leads to faster battery drainage for the UE during Wi-Fi calling. In addition, implementation depends on expensive processors. On the ePDG, the encryption requires special and expensive processors with crypto processing capability. Implementation can also be challenging. While the IPSec protocol can be implemented by software, it is computationally demanding and greatly affects the performance of the network. This makes the implementation of ePDG on commercial off-the-shelf (COTS) platforms (e.g. virtualized and cloud platforms) challenging. And there is poor connection handover. During Wi-Fi to Wi-Fi handover, the outer tunnel IP, which is given by the current Wi-Fi access point, may change as the UE migrates to another access point. As a result, the UE must re-establish the outer IPSec tunnel to ePDG, which is catastrophic for Voice over Wi-Fi (VoWIFI) type technologies.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

In some embodiments, a method for establishing sessions over a network includes sending a query, from a mobile device to an authoritative DNS server, requesting a session over a network. In response to the query, a list of available communication protocol options can be received from the authoritative DNS server. A specific communication protocol can be selected from the list of available communication protocol options, where the specific communication protocol is selected based on one or more performance metrics. A connection with a gateway device can then be initiated using the selected specific communication protocol.

In some embodiments, the selected specific communication protocol can be sent to the authoritative DNS server, and an IP address of the gateway device can be received in order to initiate the session.

In some embodiments, QUIC can be selected as the specific communication protocol and the selection can be sent to the authoritative DNS server. In response to selecting QUIC, a query can be sent to the authoritative DNS server requesting an IP address of the gateway device. Based on receiving the IP address of the gateway device, a plurality of multiplexed connections can be established between the mobile device and the gateway device, where multiple streams of data can reach the mobile device and the gateway device independently. A message over the plurality of multiplexed connections can be sent during an initial handshake process that includes an exchange of setup keys and supported protocols that enable future packets to use encryption.

In some embodiments, a same session identifier can be established between the gateway device and the mobile device based on the connection being initiated.

In some embodiments, the connection can be established under a first access point, where the session associated with the connection is associated with a session identifier, and when the mobile device migrates from the first access point to a second access point, a client hello message that includes the session identifier can be sent so that the session remains unbroken independent of a change in IP address of the mobile device.

In some embodiments, the performance metrics can be based on one or more of latency, throughput, number of handshake requests, or reducing overhead during connection setup.

In some embodiments, a message can be sent during an initial handshake process that includes an exchange of setup keys and supported protocols that enable future packets to use encryption.

In some embodiments, a system for establishing sessions over a network includes one or more processors, and at least one computer-readable storage medium having stored therein instructions which, when executed by the one or more processors, cause the one or more processors to send a query, from a mobile device to an authoritative DNS server, requesting a session over a network. In response to the query, a list of available communication protocol options can be received from the authoritative DNS server. A specific communication protocol can be selected from the list of available communication protocol options, where the specific communication protocol is selected based on one or more performance metrics. A connection with a gateway device can then be initiated using the selected specific communication protocol.

In some embodiments, a non-transitory computer-readable medium includes instructions stored thereon, the instructions executable by one or more processors of a computing system to send a query, from a mobile device to an authoritative DNS server, requesting a session over a network. In response to the query, a list of available communication protocol options can be received from the authoritative DNS server. A specific communication protocol can be selected from the list of available communication protocol options, where the specific communication protocol is selected based on one or more performance metrics. A connection with a gateway device can then be initiated using the selected specific communication protocol.

EXAMPLE EMBODIMENTS

Carrier Wi-Fi deployments can help mobile operators take advantage of already deployed evolved packet core (EPC)-based services for supporting trusted Wi-Fi access networks. Approaches include, for example, reusing Packet Data Network Gateway (PGW)-based accounting, policy enforcement, and regulatory services for supporting Wi-Fi users. With Wi-Fi calling, similar EPC-based services can be used to support IP Multimedia Subsystem (IMS)-based rich media services accessed over untrusted Wi-Fi networks.

The disclosed technology addresses the need in the art for enabling the dynamic selection of the best communication protocol to establish a secure session for an untrusted Non-3rd Generation Partnership Project (3GPP) network. Currently, 3GPP standards mandate the usage of Internet Protocol Security (IPSec) between the user equipment (UE) and the Evolved Packet Data Gateway (ePDG) on untrusted non-3GPP networks. The discovery and selection of ePDG is performed by sending a standard Domain Name System (DNS) Query using the fully qualified domain name (FQDN). The current implementation of ePDG selection does not support a variety of communication protocols (e.g. QUIC, TLS) between the UE and ePDG The problem of using IPSec protocols to open up a session (which requires a lot of back and forth messaging to authenticate), can be solved by the disclosed technology by allowing a device (such as user equipment (UE) or any device with Wi-Fi capabilities) to choose an internet transport protocol (such as QUIC) to establish secure connections. It can do so by sending, from the DNS server, protocol options that are available to the device. The device can respond with its choice of protocol, asking (and receiving) for the IP address of the ePDG. Once the IP address is available, the device can initiate communication using the best suited protocol.

Secondarily, the disclosed technology can enable seamless migration of the device between different access points (APs). It solves the problem of having to re-establish connections when a device moves to a different AP by sending a session identifier when a client hello (CHLO) message is sent to the ePDG. This can allow the ePDG to update its subscriber profile with the new device's IP address.

Accordingly, systems, methods, and devices are disclosed for establishing sessions over a network. A query can be sent, from a mobile device to a DNS server, requesting a session over a network. In response to the query, a list of available communication protocol options can be received from the DNS server. A specific communication protocol can be selected from the list of available communication protocol options, where the specific communication protocol is selected based on one or more performance metrics. A connection with a gateway device can then be initiated using the selected specific communication protocol.

Figure 1:
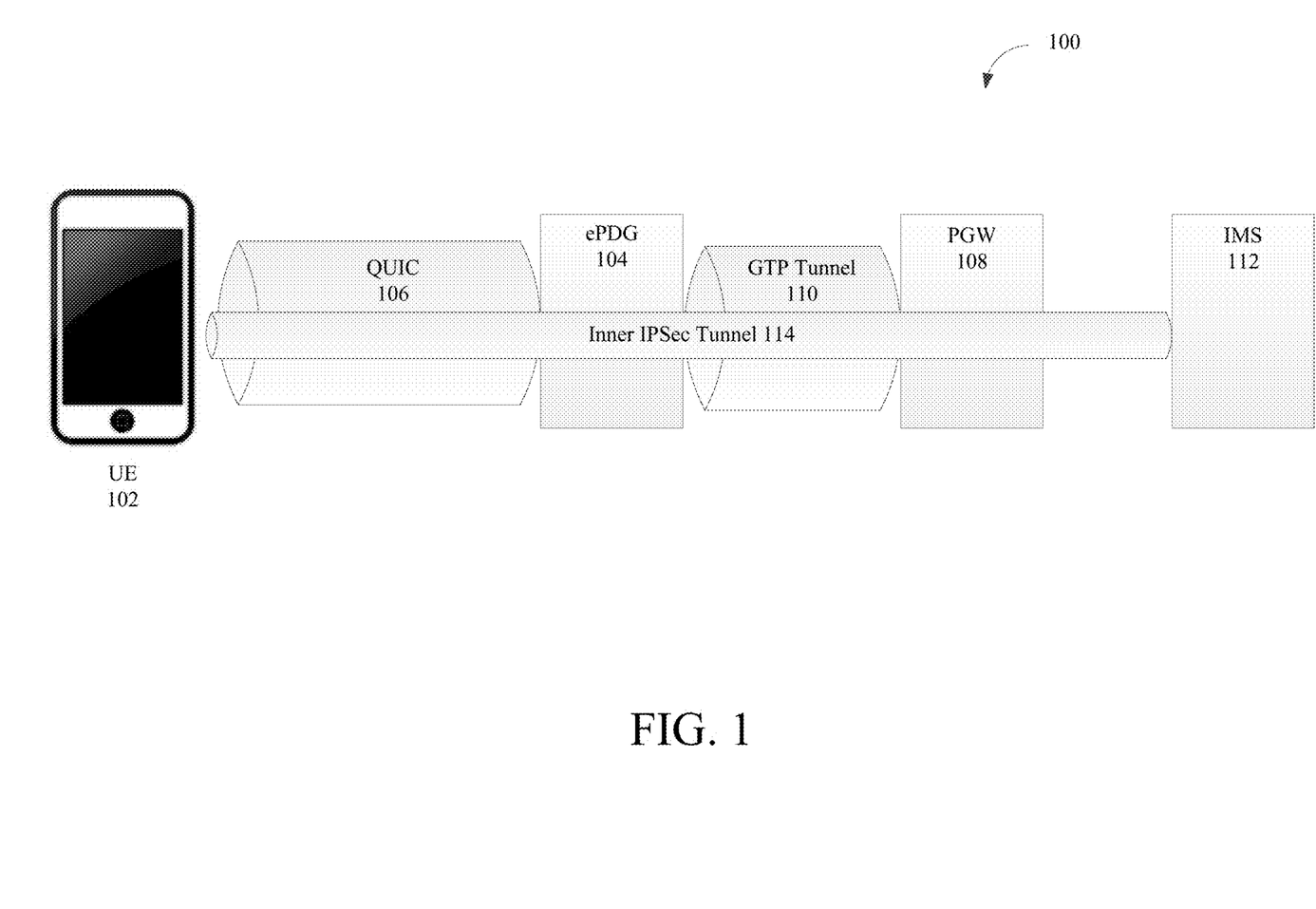
FIG. 1 shows an example diagram that establishes secure connection for non-3GPP calls in accordance with some embodiments.

FIG. 1 shows an example diagram of an exemplary system that establishes secure connection for non-3GPP calls, in accordance with some embodiments. In the example embodiment shown, instead of using multiple IPSec tunnels to establish secure communications over untrusted non-3GPP networks, system 100 has selected an alternative communication protocol (e.g. Quick User Datagram Protocol Internet Connection (QUIC)) instead.

System 100 shows that a secure connection between user equipment (UE 102) and ePDG 104 can be established through QUIC can be instead of an outer IPSec tunnel for Untrusted Non-3GPP Access communication. The ePDG 104 can be a service that enables network function of the 4G mobile core network, known as the evolved packet core (EPC). The ePDG104 can be responsible for interworking between the EPC and untrusted non-3GPP networks that require secure access, such as a Wi-Fi, LTE metro, and femtocell access networks.

Any communication protocol can be selected, and in some embodiments the selection can be based on performance criteria. For example, the communication protocol QUIC may be selected because, as an encrypted-by-default Internet transport protocol, it can provides a number of improvements designed to accelerate application traffic. For example, QUIC doesn't require CPU intensive encryption/decryption on the UE 102 while keeping the traffic. This method greatly reduces the power consumption on the UE 102 during Wi-Fi calling. Moreover, unlike IPSec, QUIC doesn't require specialized hardware to efficiently process the encrypted packets. QUIC can also be implemented in any commercial off-the-shelf (COTS) platform while providing secure connection in an efficient way. QUIC is also designed to improve performance during network-switches, such as inter access point handovers. When network-switch occurs on IPSec, a lengthy process starts where the connection needs to be re-established. To solve this problem, QUIC can use a unique connection identifier, which is not associated with the source IP. This allows the connection to be re-established simply by sending a packet containing that unique connection identifier. By using this method, QUIC doesn't require the processes of re-performing the handshake and re-establishing the session.

Moreover, QUIC can also help to reduce session establishment time by taking advantage of QUIC's zero-round-trip feature, compared to the time taken by the IPSec initial handshake in the current implementation. On congested or poor Wi-Fi radio conditions, establishing IPSec tunnels can be challenging due to high latency and packet loss. QUIC can support multiple streams with User Datagram Protocol (UDP) traffic. If a stream is missing due to high latency or packet loss, QUIC can continue by using another stream.

The ePDG 104 can connect with the Packet Data Network Gateway (PGW 108) through a GPRS Tunneling Protocol (GTP Tunnel 110), and from there connect to the IP Multimedia Subsystem (IMS) 112. The GTP Tunnel 110 can be generated via the GPRS Tunneling Protocol, a group of IP-based communications protocols used to carry general packet radio service (GPRS) within Global System for Mobile Communications (GSM), Universal Mobile Telecommunication System (UMTS), and Long-Term Evolution (LTE) networks. A single inner IPSec Tunnel 114 may still be needed between the UE 102 and IMS 112.

Figure 2:
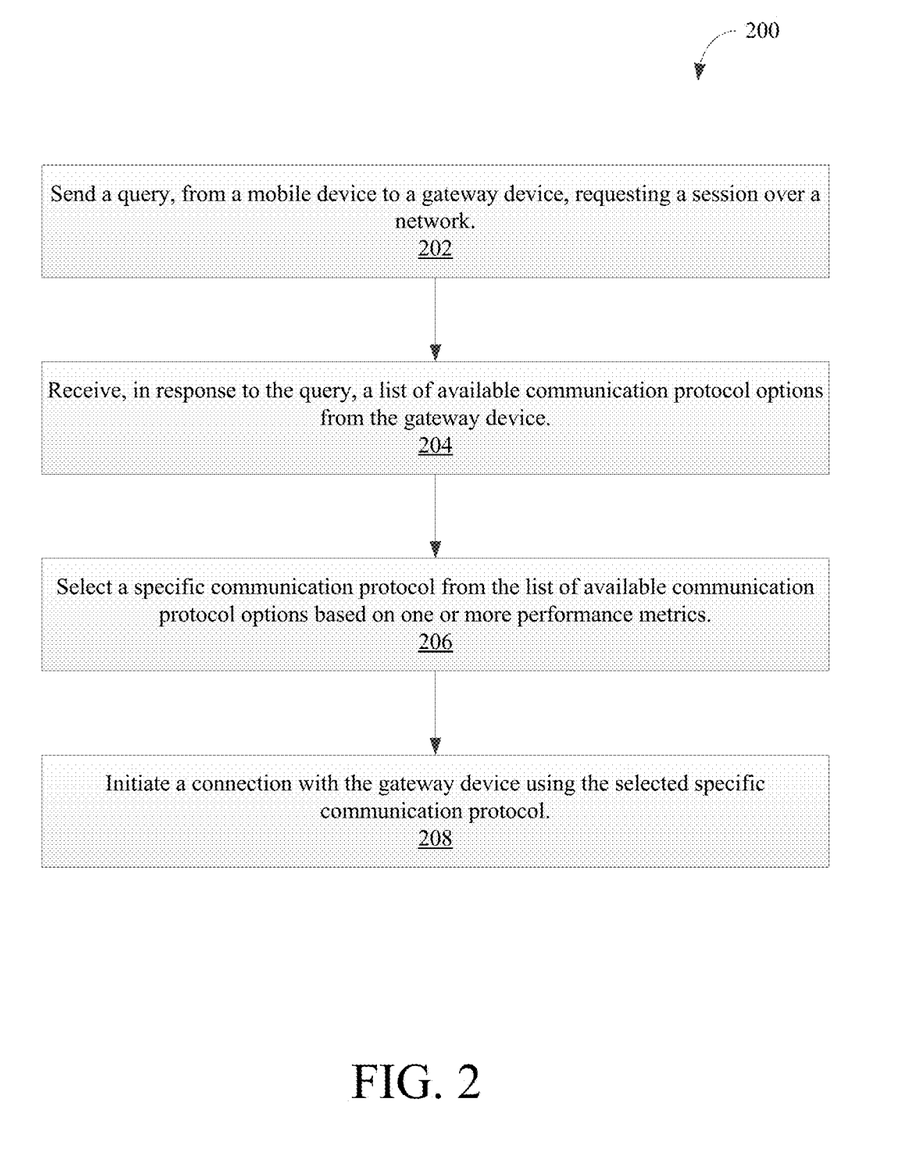
FIG. 2 shows an example flowchart representation of establishing secure sessions in accordance with some embodiments.

FIG. 2 shows an example flowchart representation of establishing secure sessions in accordance with some embodiments. In order to select the best communication protocol for establishing a secure untrusted Non-3GPP session, method 200 can begin when a mobile device (such as UE 102) sends (202) a query to a gateway device (such as ePDG 104) requesting a session over a network. In response to the query, the UE can receive (204) a list of a list of available communication protocol options from the gateway device.

Figure 3:
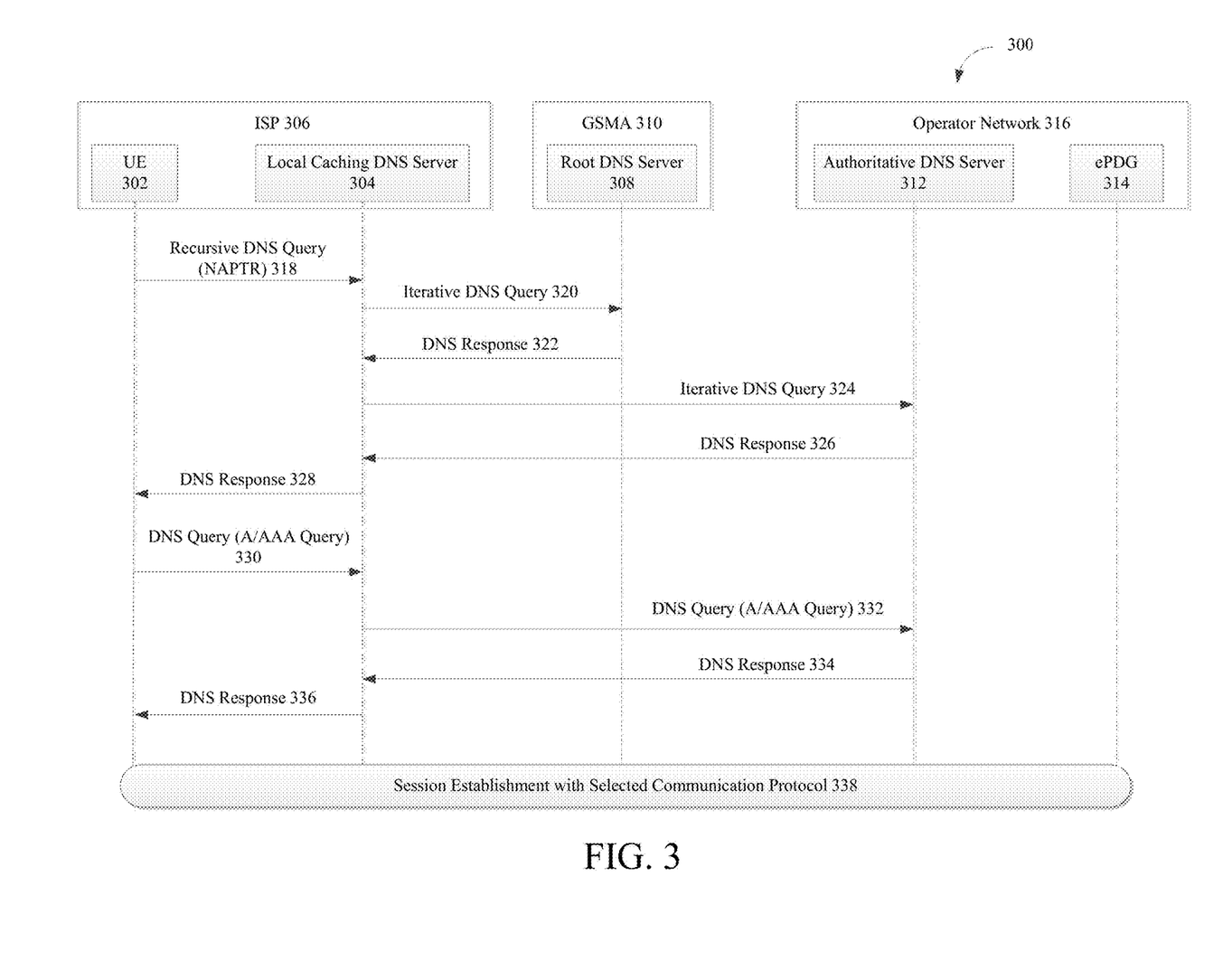
FIG. 3 shows an example diagram of dynamically selecting the communication protocol in accordance with some embodiments.

For example, FIG. 3 shows an example diagram of dynamically selecting a communication protocol in accordance with some embodiments. The diagram shows system 100 including UE 302 and a local caching DNS server 304 under internet service provider (ISP) 306. It also shows root DNS server 308 within Global System for Mobile communications Association (GSMA) service 310, and authoritative DNS server 312 and ePDG 314 within operator network 316. In order to establish a session between UE 302 and ePDG 314, if the UE 302 is not aware of the ePDG 314 IP address and its available protocols, UE 302 can send a Name Authority Pointer (NAPTR) DNS query (following request for comments memoranda (RFC 2915)) with the fully qualified domain name (FQDN) per standards. In some embodiments, UE 302 can send (318) a recursive DNS query to local caching DNS server 304 in order to establish a connection. The local caching DNS server 304 can send (320) an interactive DNS query to root DNS server 308. If the root DNS server 308 does not have relevant records for the ePDG 314 in its cache (e.g., through DNS response 322), the root DNS server 308 refers UE 302 to authoritative DNS server 312 nearest to the required DNS zone (e.g., through iterative DNS query 324) including ePDG 314.

Operator Network's 316 authoritative DNS server 312 can respond (326, 328)) to the DNS Query providing the available communication protocol options to the local caching DNS server 304 and UE 302, respectively. The available communication protocol options can be a variety of communication protocols between UE 302 and ePDG 314, such as, but not limited to, Quick User Datagram Protocol Internet Connection (QUIC), Transport Layer Security (TLS), IP Security (IPSec), etc.

In response to receiving a list of the available communication protocols, UE 302 can select (206) a specific communication protocol from the list of available communication protocols (provided by the ePDG 314) based on one or more performance metrics. For example, UE 302 can select QUIC as the specific communication protocol, and then send that selection to the authoritative DNS server 312. QUIC can be selected based on performance metrics relating to, but not limited by, the following advantages:

1. Reduces power consumption: QUIC is an encrypted-by-default Internet transport protocol that provides a number of improvements designed to accelerate application traffic. QUIC does not require CPU intensive encryption/decryption on the UE 302 and allows a large traffic flow. This method greatly reduces the power consumption on the UE 302 during Wi-Fi calling.

2. Does not require specialized hardware: QUIC does not require any specialized hardware to efficiently process the encrypted packets.

3. Implementable: QUIC can be implemented in any commercial off-the-shelf platform to provide secure connections efficiently.

4. Rapid connection handover: QUIC is designed to improve performance during network-switches, such as inter access point handovers. When a network-switch occurs on IPSec, a lengthy process takes place to re-establish the connection. In contrast, QUIC uses a unique connection identifier that is not associated with the source IP. This allows the connection to be re-established simply by sending a packet that contains the unique connection identifier. Using this method, QUIC does not need to re-perform the handshake and re-establish the session.

5. Fast session establishment: QUIC will also help to reduce session establishment time by taking advantage of QUIC's zero-round-trip feature, compared to the time taken by the IPSec initial handshake in the current implementation.

6. Stable connection: On congested or poor Wi-Fi radio condition, establishing IPSec tunnels can be challenging due to high latency and packet loss. QUIC supports multiple streams with UDP traffic. If a stream is missing due to high latency or packet loss, QUIC can continue by using another stream.

After selection of the communication protocol, a connection with the gateway device (ePDG 314) can be initiated (208) using the selected communication protocol. For example, after selecting QUIC, UE 302 can request an IP address of the ePDG 314 in order to initiate the session. Once the IP Address is available, UE 302 can then initiate the communication using the best suited protocol.

For example, UE 302 sends a DNS Query asking for the IP Address of the ePDG 314 to initiate a session. UE 302 can send (330) an A/AAAA Query to local caching DNS server 304, which can in turn send (332) to authoritative DNS server 312. The A query, also known as a DNS host record, stores a hostname and its corresponding IPv4 address. The AAAA query stores a hostname and its corresponding IPv6 address. The authoritative DNS server 312 can send (334) a response including the IP address of the ePDG 314 to local caching server 304, which can then forward (336) the response to UE 302. Using the IP Address of the ePDG 314, UE 302 can establish (338) a session with the ePDG 314 using the selected communication protocol.

In some embodiments, multiple sessions can be established at the same time (e.g., multiplexed connections between the UE 302 and ePDG 314) after receiving the IP address of the ePDG 314. In this way, multiple streams of data can reach the UE 302 and the ePDG 314 independently. This can be useful for phone services and systems, digital broadcasting, video processing, etc. Based on receiving the IP address of ePDG 314, multiplexed connections can be established based on sending a message over each connection during an initial handshake process that includes connection information, such as an exchange of setup keys and supported protocols that enable future packets to use encryption.

Figure 4:
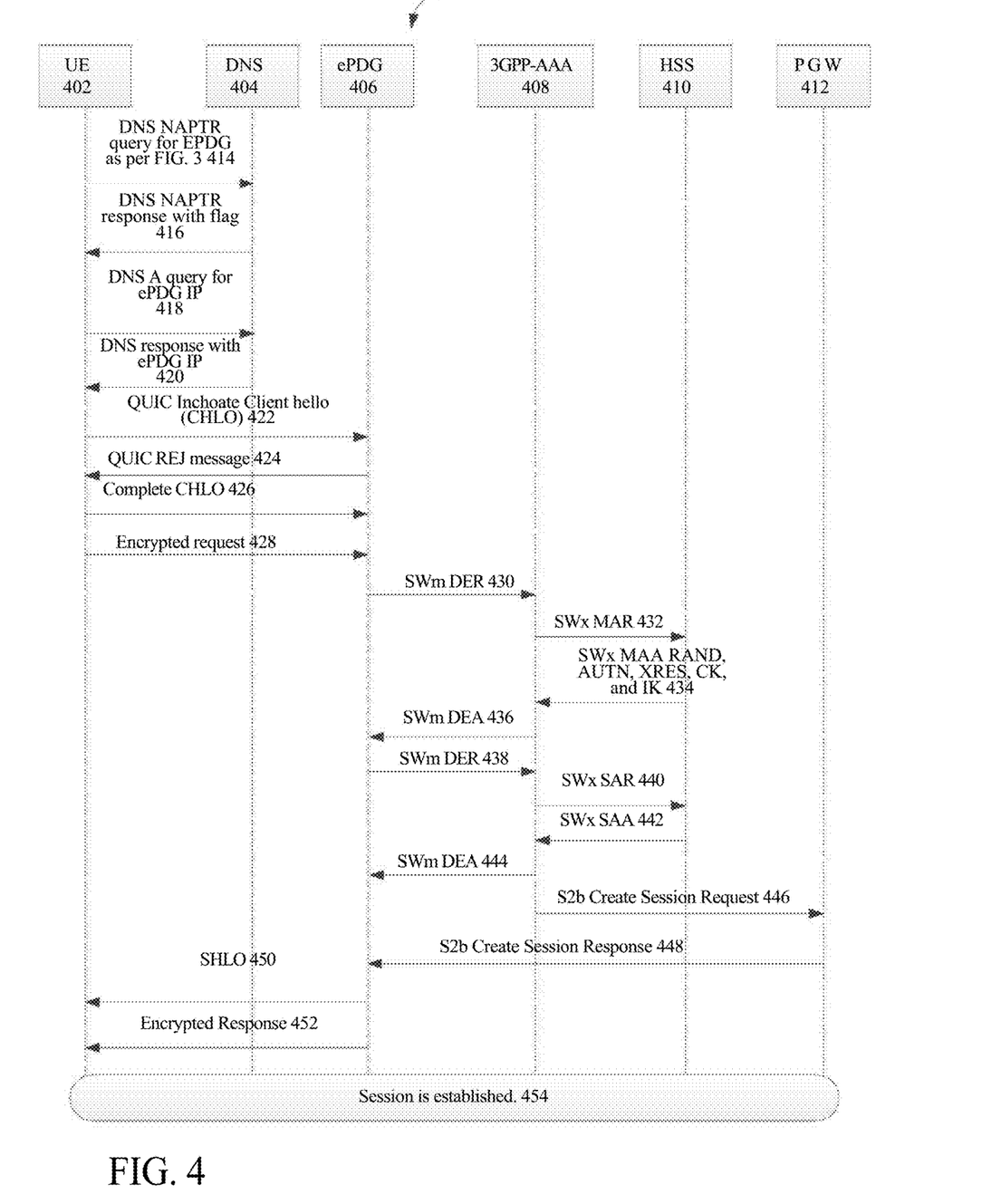
FIG. 4 shows an example diagram of user equipment attach over Wi-Fi using the selected communication protocol in accordance with some embodiments.

FIG. 4 shows an example diagram of UE 302 attach over Wi-Fi using the selected communication protocol in accordance with some embodiments. System 400 includes, for example, UE 402, DNS server 404, ePDG 406, 3GPP AAA server 408, Home Subscriber Server (HSS) 410, and Packet Data Network Gateway (PGW) 412. The 3GPP AAA server 408 can perform AAA functions and may also act as an AAA proxy server. For WLAN 3GPP IP Access it can provide authorization, policy enforcement, and routing information to the PDG 412, WLAN Access Gateway (WAG), and/or Wireless LAN Access Network (WLAN AN). The HSS 410 can be a subscriber database used within the IP Multimedia Subsystem (IMS) which provides details of the subscribers to other entities within the network. The IMS enables users to be granted or refused access to other services dependent on their status.

When the subscriber initiates a Wi-Fi call, UE 402 can perform DNS requests to resolve the ePDG 406 SWu IP Address. In order to resolve the ePDG 406 IP address, UE 402 can perform (414) NAPTR query to DNS 404, similar to that disclosed in FIG. 3.

DNS 404 can then send (416) a NAPTR response to UE 402 including one or more flags for available communication protocols, such as a flag for QUIC capabilities, IPSec capabilities, TLS capabilities, etc. UE 402 can select a communication protocol flagged within the NAPTR response. For example, UE 402 can select QUIC instead of IPSec. In some embodiments, UE 492 can be set to favor QUIC over IPSec as one of its preferred communication protocols.

UE 402 can send (418) a second query (e.g., an A query for the ePDG 406 IP address) to DNS 404. In response to selecting QUIC, DNS 404 can respond (420) to UE 402 with the ePDG 406 IP address. Once the UE 402 receives the IP ePDG 406 IP address, system 400 can send messages during an initial handshake process that can include an exchange of setup keys and supported protocols that enable future packets to use encryption.

For example, once UE 402 receives the ePDG 406 IP Address, UE 402 can perform (422) a QUIC inchoate client hello (CHLO) message to the ePDG 406 server. This message can contain international mobile subscriber identity (IMSI) information, which can be used by LTE or 5G components (e.g., ePDG 406, 3GPP-AAA 408, HSS 410) to authenticate the subscriber. In some embodiments, the subsequent message can be similar with current flow as per 3GPP TS 23.402 standards. Once the network authenticates the IMSI, ePDG 406 can send (424) a reject (REJ) to the UE 402, which also contains RAND, AUTN, XRES, CK, and IK information. The UE 402 can use this information to validate the authentication.

Once successful, UE 402 can send to the ePDG 406 the complete CHLO message (426) followed by an encryption request (428). Registration can proceed by the ePDG 406 sending a SWm DER message (430) to the 3GPP-AAA 408, which can send a SWx MAR message to HSS 410 (432). HSS 410 can send to 3GPP-AAA 408 the SWx MAA RAND, AUTN, XRES, CK, and IK information (434) and then send the SWm DEA (436) and receive the SWm DER (438) from the ePDG 406. The 3GPP-AAA can then send the SWx SAR (440) and receive the SWx SAA (442) from HSS 410, and then 3GPP-AAA 408 can send the SWm DEA (444) to the ePDG 406. The 3GPP-AAA can send an S2b create session request (446) to the PGW 412, which can send the S2b create session response (448) to the ePDG 406.

Once the registration is completed, the ePDG 406 can send the SHLO (450) to the UE 402, followed by the encryption response (452). At the end of the call flow, the subscriber will be attached to the network, and ePDG 406 and UE 402 are sharing the same QUIC session identifier. The session is thus established (454).

Figure 5:
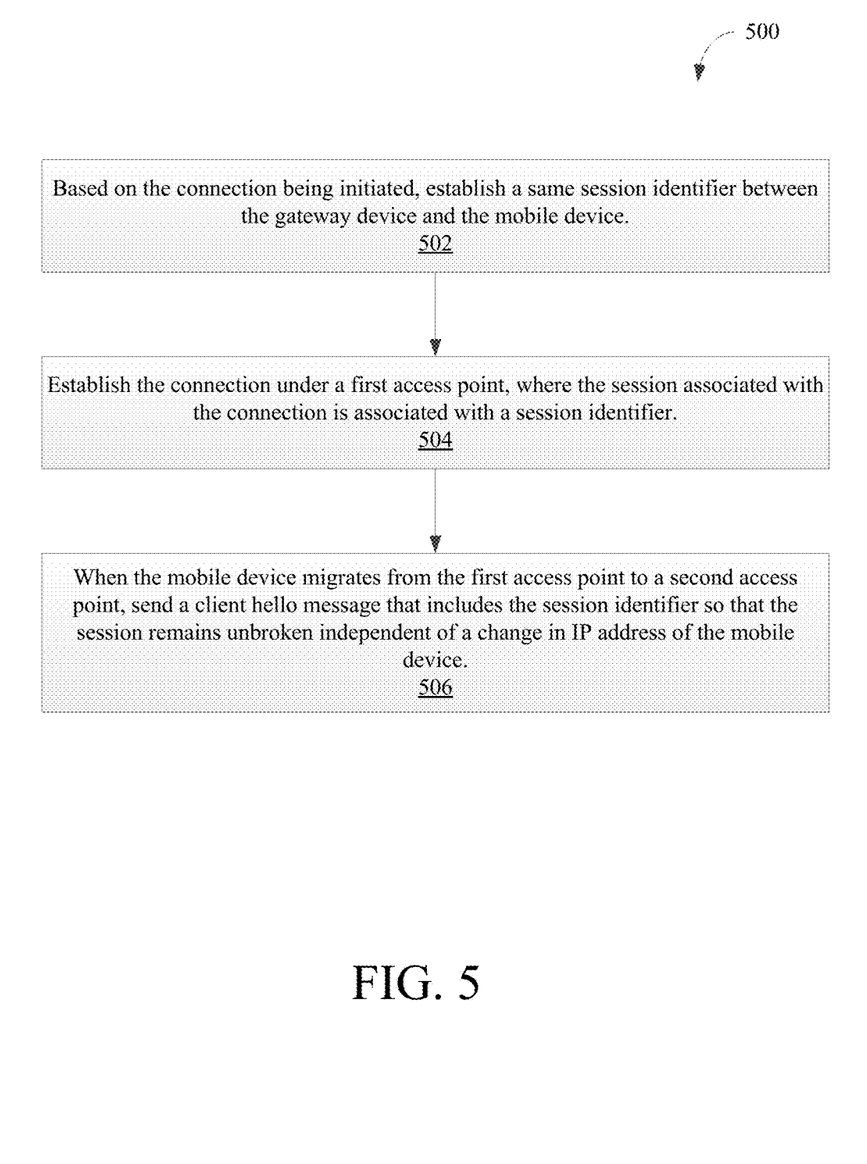
FIG. 5 shows an example flowchart representation of migration between access points in accordance with some embodiments.

In some embodiments, the UE may migrate between different access points (APs). In order to quickly and dynamically handle migration between APs and re-establish connection, a unique session identifier based on the selected communication protocol can be created. FIG. 5, for example, shows an example flowchart representation of migration between access points in accordance with some embodiments.

Method 500 can establish (502), in some embodiments, a same session identifier between the gateway device (e.g., ePDG) and the mobile device (e.g., UE) based on the connection being initiated. Accordingly, when the connection is established (504) via the selected communication protocol under a first AP, the session associated with the connection can be associated with the session identifier.

When the mobile device migrates from the first AP to a second AP, the mobile device can send (506) a client hello message that includes the session identifier so that the session remains unbroken independent of a change in IP address of the mobile device.

Figure 6:
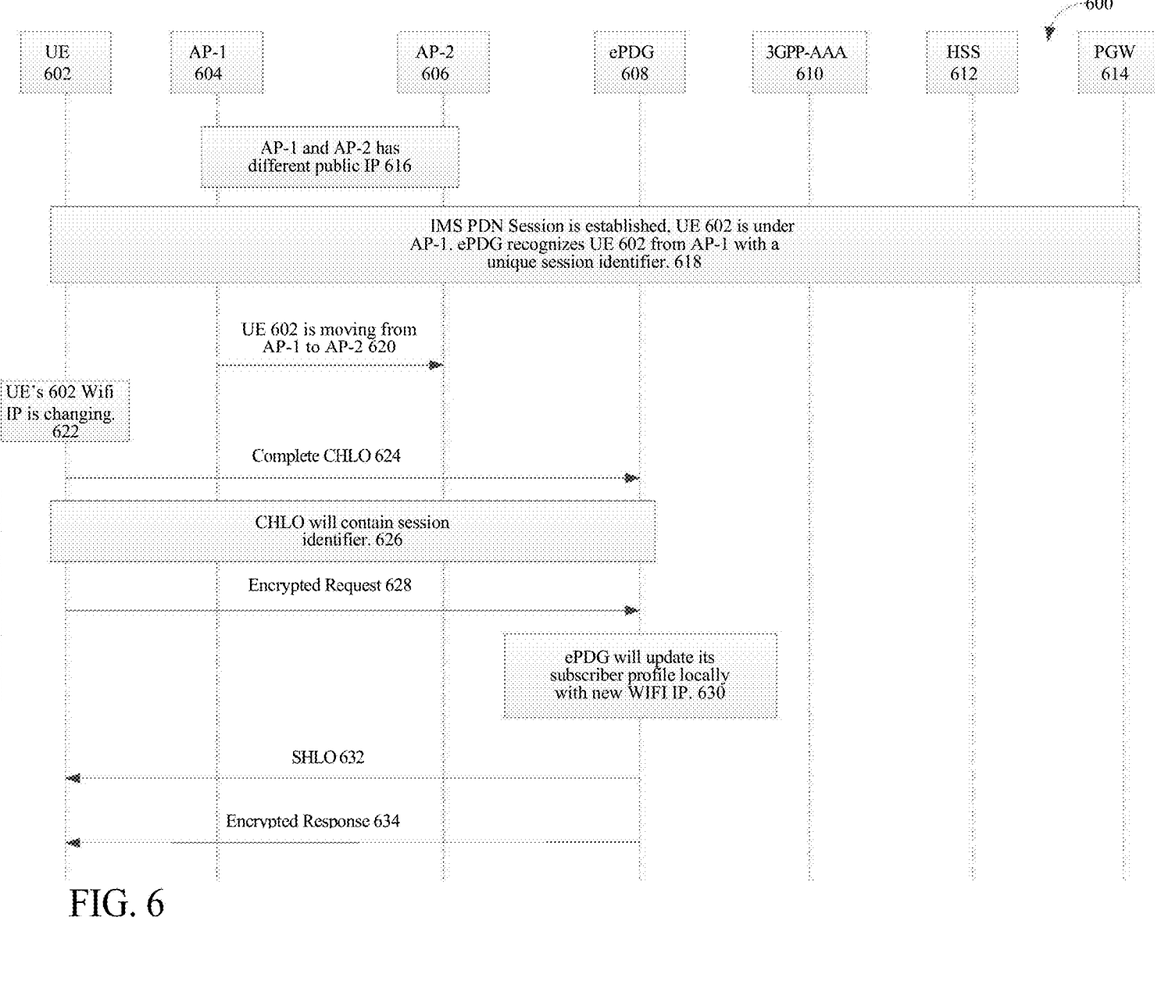
FIG. 6 shows an example diagram of enabling mobility between access points in accordance with some embodiments.

FIG. 6, for example, shows an example system 600 of enabling mobility between access points in accordance with some embodiments. System 600 can include UE 602, Access Point 1 (AP-1) 604, Access Point 2 (AP-2) 606, ePDG 608, 3GPP-AAA 610, HSS 612, and PGW 614. In this example, AP-1 604 has a different public IP address than AP-2 606 (616).

UE 602 can have a session established (618) with PGW 614, where the UE 602 is under AP-1 604. The session can be established using a selected communication protocol, such as QUIC, similar to the systems and methods described in FIGS. 1-4. This can be an IMS PDN session.

Once the UE 602 is connected to the ePDG, the UE 602 can be associated with a specific and unique session identifier (such as a QUIC session identifier based on the selection of QUIC as the communication protocol). In the example embodiment, for example, the ePDG 608 can recognize UE 602 from AP-1 604 with its unique session identifier. In some embodiments, the ePDG 608 can receive the session identifier from UE 602, or can create and associate the session identifier with UE 602, during the client hello (CHLO) and/or handshake process.

After a session is established for UE 602 at AP-1 604, the UE 602 may move to another AP. Mobility between APs is challenging, where the UE 602 IP address provided by the Wi-Fi AP needs to be changed—for example, when a device migrates to another AP, it needs to re-establish the session. Moreover, establishing IPSec tunnels (especially multiple IPSec tunnels in the case of the conventional IPSec procedure), suffers from high latency and packet loss. Since IPSec has long session establishment time compared to QUIC, and QUIC does not need to establish multiple IPSec tunnels, device migration between different APs can be supported. Moreover, with a communication protocol like QUIC, multiple streams with UDP traffic can be supported, so that if a stream is missing (due to packet loss or high latency), QUIC can continue using another stream.

When UE 602 moves (620) from AP-1 604 to AP-2 606, the migration can result in the change of the IP address provided by the AP currently connected to the UE 602. For example, the IP address provided by AP-1 604 can be different from the IP address provided by AP-2 606 when UE 602 migrates between them (e.g., UE's 602 Wi-Fi IP address is changing (622)).

Once the new IP address is assigned to the UE 602, the UE 602 will inform the ePDG 608 of the new assignment with a complete client hello (CHLO) message (624) and encrypted request (628). In the example embodiment, since QUIC has been selected, the CHLO message can be a QUIC Complete CHLO message that contains the session identifier (626). This can be a QUIC feature of 0-RTT.

The ePDG 608 can then update its subscriber profile with the new UE 602 IP address based on the session identifier (630). After that, the ePDG 608 can respond with a server hello message, SHLO (632), and an encrypted response (634). In some embodiments, the ePDG 608 doesn't have to update this change in IP Address provided by the WI-FI APs to the other network elements (e.g., 3GPP-AAA 610, PGW 614, etc.) during this mobility.

This disclosure therefore describes mechanisms, systems, and devices that provide flexibility to mobile devices and ePDG servers to choose the protocol of communication instead of being restricted to IPSec. For the implementation of Untrusted Non-3GPP Access communication, an example embodiments could use QUIC instead of IPSec when choosing the best communication protocol based on one or more performance metrics, such as, but not limited to, QUIC's ability to offer performance benefits including 0-RTT, eliminating the need of specialized hardware, eliminating the need for CPU intensive protocols, etc. without compromising security.

Figure 7:
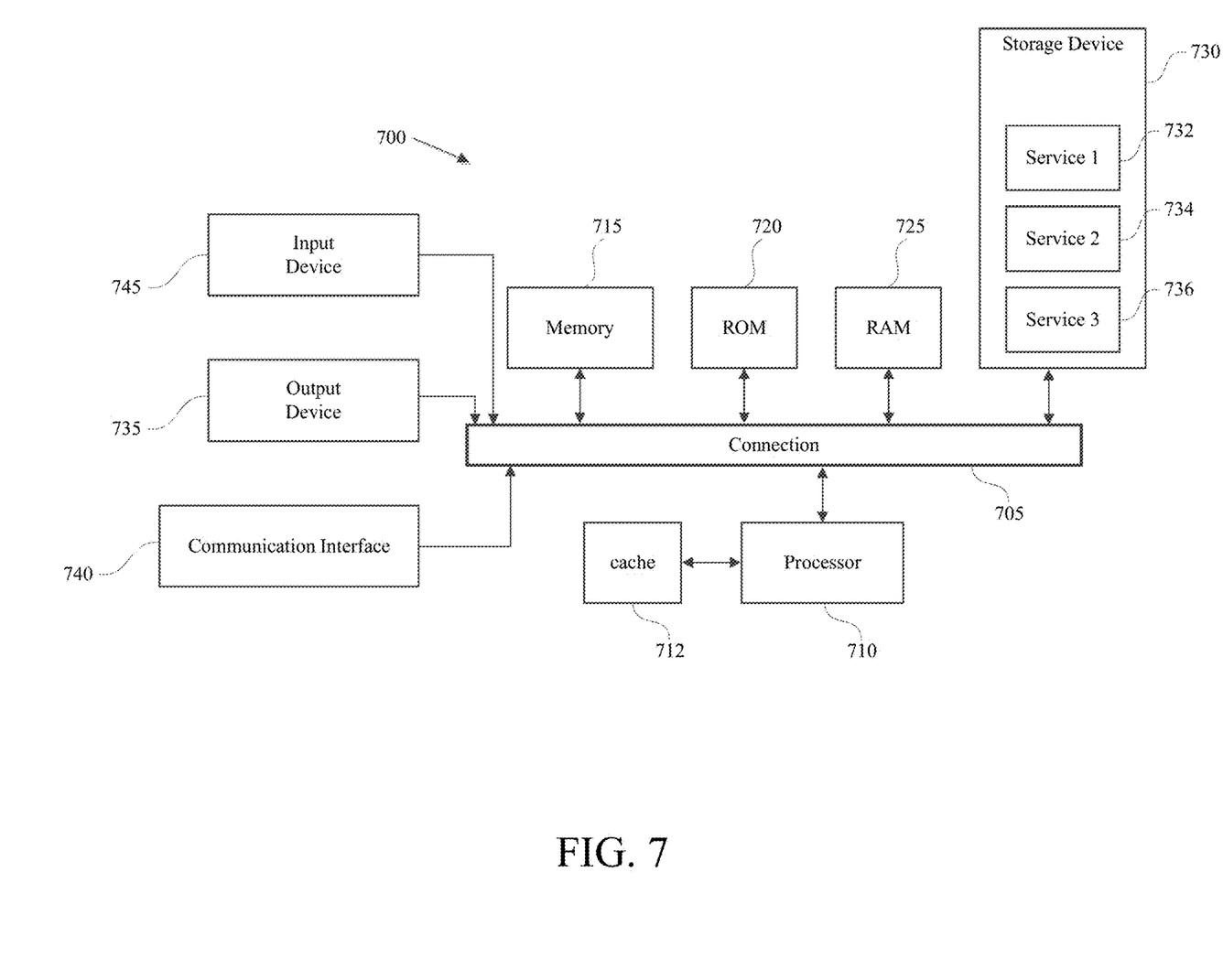
FIG. 7 shows an example of a system for implementing certain aspects of the present technology.

FIG. 7 shows an example of computing system 700 in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for establishing sessions over a network comprising:
    sending a query, from a mobile device to an authoritative Domain Name System (DNS) server, requesting a session over a network;
    receiving, in response to the query, a list of available communication protocol options from the authoritative DNS server, the list including Quick User Datagram Protocol Internet Connection (QUIC);
    selecting QUIC as a specific communication protocol from the list of available communication protocol options, wherein the specific communication protocol is selected based on one or more performance metrics;
    based on receiving an IP address of a gateway device from the DNS server, establishing a plurality of multiplexed connections between the mobile device and the gateway device, wherein multiple streams of data reach the mobile device and the gateway device independently; and
    sending a message over the plurality of multiplexed connections during an initial handshake process that includes an exchange of setup keys and supported protocols that enable future packets to use encryption; and
    initiating a connection with the gateway device using the selected specific communication protocol.

2. The method of claim 1, the method further comprising:
    sending the selected specific communication protocol to the authoritative DNS server; and
    receiving an IP address of the gateway device in order to initiate the session.

3. The method of claim 1, further comprising:
    based on the connection being initiated, establishing a same session identifier between the gateway device and the mobile device.

4. The method of claim 1, the method further comprising:
    establishing the connection under a first access point, wherein the session associated with the connection is associated with a session identifier; and
    when the mobile device migrates from the first access point to a second access point, sending a client hello message that includes the session identifier so that the session remains unbroken independent of a change in IP address of the mobile device.

5. The method of claim 1, wherein the performance metrics are based on one or more of latency, throughput, number of handshake requests, or reducing overhead during connection setup.

6. The method of claim 1, further comprising:
    sending a message during an initial handshake process that includes an exchange of setup keys and supported protocols that enable future packets to use encryption.

7. A system comprising:
    one or more processors; and
    at least one computer-readable storage medium having stored therein instructions which, when executed by the one or more processors, cause the one or more processors to:
        send a query, from a mobile device to an authoritative Domain Name System (DNS) server, requesting a session over a network;
        receive, in response to the query, a list of available communication protocol options from the authoritative DNS server, the list including Quick User Datagram Protocol Internet Connection (QUIC);
        select QUIC as a specific communication protocol from the list of available communication protocol options, wherein the specific communication protocol is selected based on one or more performance metrics;
        based on receiving an IP address of a gateway device from the DNS server, establish a plurality of multiplexed connections between the mobile device and the gateway device, wherein multiple streams of data reach the mobile device and the gateway device independently; and
        send a message over the plurality of multiplexed connections during an initial handshake process that includes an exchange of setup keys and supported protocols that enable future packets to use encryption; and
        initiate a connection with the gateway device using the selected specific communication protocol.

8. The system of claim 7, the one or more processors further caused to:
    send the selected specific communication protocol to the authoritative DNS server; and
    receive an IP address of the gateway device in order to initiate the session.

9. The system of claim 7, the one or more processors further caused to:

based on the connection being initiated, establish a same session identifier between the gateway device and the mobile device.

10. The system of claim 7, the one or more processors further caused to:
   establish the connection under a first access point, wherein the session associated with the connection is associated with a session identifier; and
   when the mobile device migrates from the first access point to a second access point, send a client hello message that includes the session identifier so that the session remains unbroken independent of a change in IP address of the mobile device.

11. The system of claim 7, wherein the performance metrics are based on one or more of latency, throughput, number of handshake requests, or reducing overhead during connection setup.

12. The system of claim 7, the one or more processors further caused to:
   send a message during an initial handshake process that includes an exchange of setup keys and supported protocols that enable future packets to use encryption.

13. A non-transitory computer-readable storage medium having stored therein instructions which, when executed by a processor, cause the processor to perform operations comprising:
   sending a query, from a mobile device to an authoritative Domain Name System (DNS) server, requesting a session over a network;
   receiving, in response to the query, a list of available communication protocol options from the authoritative DNS server, the list including Quick User Datagram Protocol Internet Connection (QUIC);
   selecting QUIC as a specific communication protocol from the list of available communication protocol options, wherein the specific communication protocol is selected based on one or more performance metrics;
   based on receiving an IP address of a gateway device from the DNS server, establishing a plurality of multiplexed connections between the mobile device and the gateway device, wherein multiple streams of data reach the mobile device and the gateway device independently; and
   sending a message over the plurality of multiplexed connections during an initial handshake process that includes an exchange of setup keys and supported protocols that enable future packets to use encryption; and
   initiating a connection with the gateway device using the selected specific communication protocol.

14. The non-transitory computer-readable storage medium of claim 13, the processor further caused to perform the operations comprising:
   sending the selected specific communication protocol to the authoritative DNS server; and
   receiving an IP address of the gateway device in order to initiate the session.

15. The non-transitory computer-readable storage medium of claim 13, the processor further caused to perform the operations comprising:
   based on the connection being initiated, establishing a same session identifier between the gateway device and the mobile device.

16. The non-transitory computer-readable storage medium of claim 13, the processor further caused to perform the operations comprising:
   establishing the connection under a first access point, wherein the session associated with the connection is associated with a session identifier; and
   when the mobile device migrates from the first access point to a second access point, sending a client hello message that includes the session identifier so that the session remains unbroken independent of a change in IP address of the mobile device.

17. The non-transitory computer-readable storage medium of claim 13, the processor further caused to perform the operations comprising:
   sending a message during an initial handshake process that includes an exchange of setup keys and supported protocols that enable future packets to use encryption.

* * * * *